(12) United States Patent
Huber et al.

(10) Patent No.: US 8,770,921 B2
(45) Date of Patent: Jul. 8, 2014

(54) SYSTEMS AND METHODS FOR REDUCING NOISE FROM JET ENGINE EXHAUST

(75) Inventors: Jerome Huber, Toulouse (FR); Jean-Paul Bonnet, Poitiers (FR); Joel Delville, Poitiers (FR); Peter Jordan, Rom (FR); Francois Strekowski, Poitiers (FR)

(73) Assignees: Airbus Operations S.A.S., Toulouse (FR); Centre National de la Recherche Scientifique (CNRS), Paris (FR); Université de Poitiers, Poitiers (FR)

( * ) Notice: Subject to any disclaimer, the term of this patent is extended or adjusted under 35 U.S.C. 154(b) by 856 days.

(21) Appl. No.: 12/935,450

(22) PCT Filed: Mar. 31, 2009

(86) PCT No.: PCT/FR2009/000375
§ 371 (c)(1),
(2), (4) Date: Sep. 29, 2010

(87) PCT Pub. No.: WO2009/133272
PCT Pub. Date: Nov. 5, 2009

(65) Prior Publication Data
US 2011/0027070 A1    Feb. 3, 2011

(30) Foreign Application Priority Data
Mar. 31, 2008   (FR) ...................................... 08 52121

(51) Int. Cl.
*F01D 9/02* (2006.01)
(52) U.S. Cl.
USPC ...... 415/116; 415/211.2; 60/770; 239/265.17

(58) Field of Classification Search
USPC .............. 415/116, 211.2; 60/770; 239/265.17
See application file for complete search history.

(56) References Cited

U.S. PATENT DOCUMENTS 2,990,905 A    7/1961    Lilley
(Continued)

FOREIGN PATENT DOCUMENTS

| EP | 1 580 417 | 9/2005 |
| EP | 1 936 172 | 6/2008 |

(Continued)

OTHER PUBLICATIONS

U.S. Appl. No. 12/935,423, filed Sep. 29, 2010, Huber, et al.

(Continued)

*Primary Examiner* — Ninh H Nguyen
(74) *Attorney, Agent, or Firm* — Oblon, Spivak, McClelland, Maier & Neustadt, L.L.P.

(57) ABSTRACT

An aircraft jet engine with a longitudinal axis, including a wall enclosing a gas flow ejected from a downstream end of the wall in the longitudinal axis, plural ducts being distributed around the periphery of the downstream end of the wall each including a terminal section, including an outlet opening. Each duct can eject a fluid jet through the outlet opening thereof. The ducts are configured to eject the fluid jets essentially parallel to each other, each fluid jet ejected through the corresponding outlet opening forming a lateral angle with the longitudinal axis in a projection view in a plane with the longitudinal axis.

9 Claims, 5 Drawing Sheets

(56) References Cited

U.S. PATENT DOCUMENTS

| | | | |
|---|---|---|---|
| 5,428,954 A * | 7/1995 | Cowan, Sr. | 60/262 |
| 6,571,549 B1 * | 6/2003 | Stanek | 60/262 |
| 7,966,826 B2 * | 6/2011 | Alkislar et al. | 60/770 |
| 8,015,819 B2 * | 9/2011 | Thomas et al. | 60/770 |
| 8,020,368 B2 * | 9/2011 | Bonnet et al. | 60/262 |
| 2005/0210860 A1 | 9/2005 | Gutmark et al. | |
| 2008/0134665 A1 | 6/2008 | Birch et al. | |
| 2008/0271431 A1 | 11/2008 | Porte | |
| 2010/0065680 A1 | 3/2010 | Huber et al. | |

FOREIGN PATENT DOCUMENTS

| | | |
|---|---|---|
| FR | 1 542 668 | 10/1968 |
| FR | 2 872 549 | 1/2006 |
| FR | 2 892 152 | 4/2007 |
| WO | 2008 100712 | 8/2008 |

OTHER PUBLICATIONS

U.S. Appl. No. 12/935,445, filed Sep. 29, 2010, Huber, et al.

U.S. Appl. No. 13/357,065, filed Jan. 24, 2012, Huber, et al.

Greska, B. et al., "The Effects of Microjet Injection on an F404 Jet Engine (AIAA 2005-3047)", 11$^{th}$ AIAA/CEAS Aeroacoustics Conference (26the AIAA Aeroacoustics Conference), pp. 1-23, (May 23-25, 2005) XP002519066.

Alkislar, M.B. et al., "Significant Improvements on Jet Noise Reduction by Chevron-Microjet Combination (AIAA 2007-3598)", 12$^{th}$ AIAA/CEAS Aeroacoustics Conference (28$^{th}$ AIAA Aeroacoustics Conference), pp. 1-8 (May 21-23, 2007). XP002518550.

Henderson, B. S. et al., "The Impact of Fluidic Chevrons on jet Noise (AIAA 2005-2888)", 11$^{th}$ AIAA/CEAS Aeroacoustics Conference (26$^{th}$ AIAA Aeroacoustics Conference), pp. 1-13 (May 23-25, 2005) XP 002518551.

International Search Report issued Nov. 12, 2009 in PCT/FR09/000375 Mar. 31, 2009.

* cited by examiner

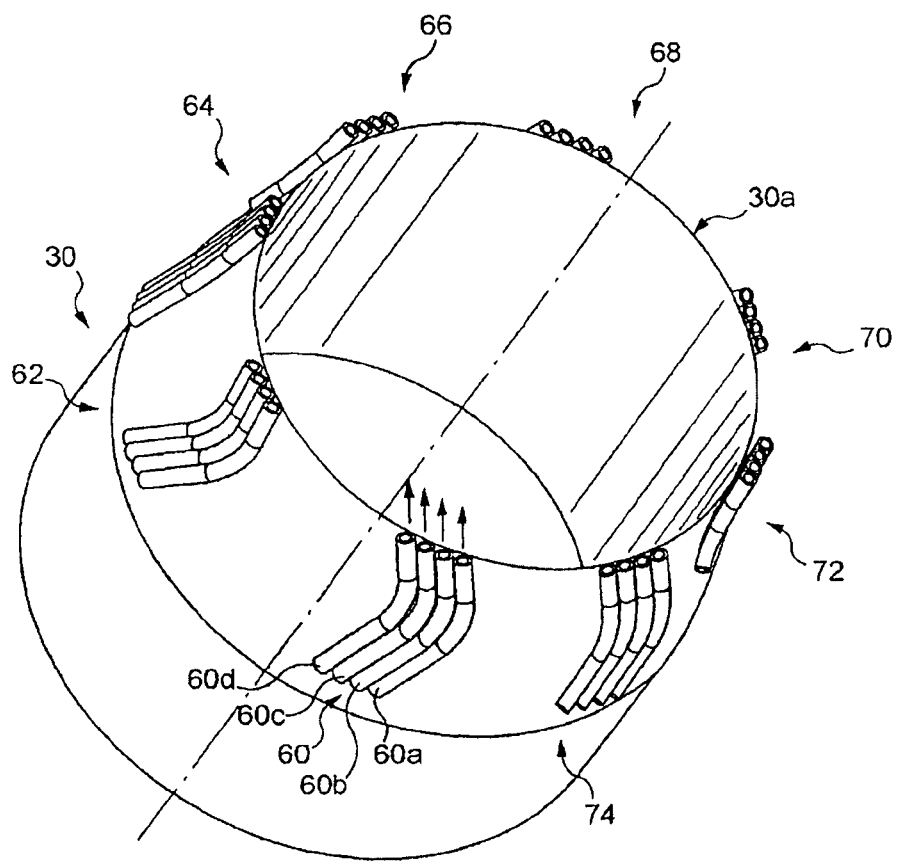
Fig. 3
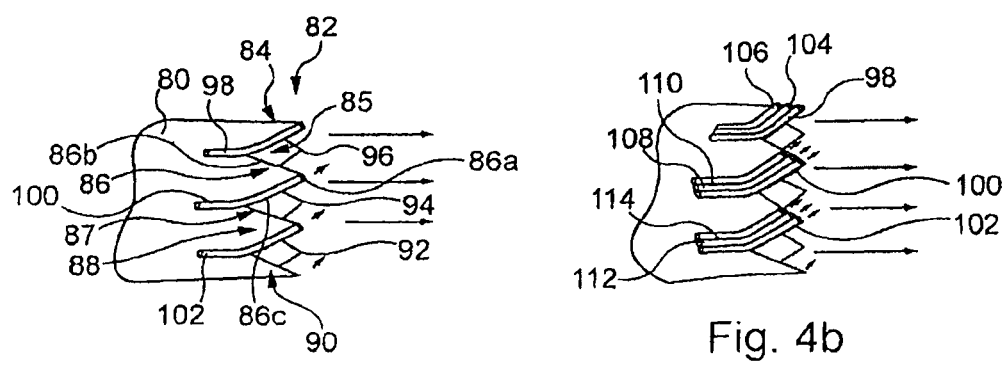
Fig. 4a
Fig. 4b

SYSTEMS AND METHODS FOR REDUCING NOISE FROM JET ENGINE EXHAUST

The invention relates to an aircraft engine.

In known manner, an aircraft jet engine comes in the form of a nacelle in the center of which a turbomachine is positioned.

This nacelle is intended to be installed under the wing group of an aircraft by means of an engine nacelle pylon.

The turbomachine consists of a gas generator that drives a fan installed on the shaft of the gas generator, upstream from the latter along the longitudinal direction of the jet engine nacelle.

The air stream that passes longitudinally through the nacelle penetrates partially into the gas generator and takes part in combustion.

This stream is called primary stream and is ejected at the outlet of the generator.

The part of the air stream penetrating into the nacelle and that does not pass through the gas generator is carried along by the fan.

This stream, called secondary stream, flows in an annular passage, concentrically in relation to the primary stream. This passage is formed between an outer longitudinal wall (nacelle wall) and an inner longitudinal wall surrounding the gas generator.

The secondary stream is ejected from the nacelle at the downstream end of the outer wall of the latter along the more or less longitudinal direction of the jet engine.

The inner wall surrounding the generator for the gas also defines with an inner longitudinal part an annular passage through which the primary stream flows.

This stream is ejected at the downstream end of the inner wall that surrounds the gas generator.

During take-off phases, the gas stream that is ejected (primary and secondary stream) takes on very high speeds. At these speeds, the meeting of the ejected stream with the surrounding air, as does the meeting of the primary stream and the secondary stream, generates a considerable noise.

A fluidic device for reduction of noise generated by an aircraft jet engine is known from international application WO2002/013243.

This device comprises several pairs of ducts opening into the outlet of a nozzle of the jet engine ejecting a propulsive jet and which are distributed around the periphery of this nozzle.

The ducts of each pair each eject an air jet and are disposed in convergent manner in relation to each other in order to generate at the outlet a triangle of interaction of the air jets or "fluid triangle."

The angle of convergence of the ducts is between 40 and 70°.

This device is satisfactory for small nozzle sizes.

Nonetheless, when the diameters of the nozzles take on relatively high values, for example on the order of a meter, the aforementioned device loses its effectiveness.

The fluid jets originating from the convergent ducts in fact cannot interact with the entirety of the propulsive jet ejected by the nozzle. For this reason, a portion thereof meets the external peripheral flow of air, thus generating noise.

Furthermore, although the convergent micro-jets are effective in generating fluid triangles, their convergence may cause interactions generating spurious noises at higher frequencies.

A need therefore exists to reduce the noise caused by the ejection of the gas stream or streams at the outlet of the jet engine nacelle of an aircraft.

To this end, the invention has as an object an aircraft jet engine, comprising a wall surrounding a gas stream that is ejected at a downstream end of the wall along the longitudinal axis, several ducts distributed around the periphery of the downstream end of the wall and each comprising a terminal portion provided with an outlet opening, each duct being able to eject a fluid jet through its outlet opening, characterized in that the ducts are designed so as to eject fluid jets more or less parallel to each other, each fluid jet ejected through the corresponding outlet opening forming a lateral angle with the longitudinal axis XX' along a projection view in a plane containing the longitudinal axis.

By orienting all the fluid jets originating from the openings in the same direction along the same lateral incidence (lateral angle with the same sign), these jets do not converge and therefore interactions among jets that are the cause of spurious noises are prevented.

The fluid jets produce an interaction with the propulsive jet (ejected gas stream) of a kind comparable to that of the convergent jets (described in application WO2002/013243) in the generation of longitudinal vortexes. They do not, however, form a fluid triangle and therefore do not implement certain vortex generations characteristic of these triangular fluidic disturbances.

These jets oriented in this way (with a lateral incidence) are distributed around the outer periphery of the longitudinally ejected gas stream and flow around the latter in the manner of a helix.

The fluid jets generated in this way reduce the interaction between the gas stream ejected at the downstream end of the wall and the gas stream (for example the air) flowing around the outer periphery of the wall of the jet engine.

For this reason, the outer stream is carried along by the high-speed ejection of the gas stream less easily than before and the noise generated by the meeting of these streams therefore is reduced.

The closer the fluid jets are, the more they contribute to forming a fluidic shield around the ejected gas stream, creating as it were a soundproofing sheath preventing the flow interactions that are the cause of the noise.

It should be noted, however, that there is a compromise between the number of jets and the acceptable output that corresponds to an engine bleed that must be limited to a few percentages.

Furthermore, if there was a continuity of the jets along the periphery, there would be no generation of longitudinal vortexes and no break of the azimuthal modes would be introduced.

It will be noted that it is the ducts that impart to the fluid jets, by virtue of their geometric configuration or design, their geometric orientation in relation to the ejected gas stream and, in particular, the lateral angle of these jets isolated from each other.

According to one characteristic, the ducts are designed so as to eject each fluid jet slanted toward the longitudinal axis XX' along a penetration angle that is, for example, between 8° (slight penetration) and 60° (strong penetration).

This slant on the longitudinal axis that constitutes the axis of the ejected gas stream allows the fluid jets ejected with a given lateral incidence to interact with this stream like the convergent jets mentioned above with reference to the application WO2002/013243.

This interaction generates longitudinal vortexes that are effective for amplifying the effect produced by single jets.

According to a first approach, the lateral angle is formed by the orientation of the terminal portion of a duct with the longitudinal axis XX', while the penetration angle is formed by the slant of the outlet opening of the duct toward the longitudinal axis XX'.

The two different orientations of the fluid jets therefore are given by two distinct elements of each duct: the terminal portion that may be bent in relation to the upstream portion of the duct and the outlet opening that may be designed (e.g. beveled . . . ) in a manner appropriate for imparting the desired complementary orientation.

In this example, the terminal portion of the duct is bent laterally and the outlet opening is oriented toward the longitudinal axis.

According to a second approach, the lateral angle is formed by the orientation of the outlet opening of a duct with the longitudinal axis XX', while the penetration angle is formed by the slant of the terminal portion of a duct toward the longitudinal axis XX'.

In this example, the terminal portion of the duct is bent toward the longitudinal axis and the outlet opening is oriented laterally.

One or the other of these approaches may be adopted according to the constraints for integration into the wall of the jet engine (integration into the outer or inner face of the wall or in the thickness thereof) and the configuration of the jet engine.

The distribution of the ducts is not inevitably regular along the periphery. For example, the ducts may be distributed in groups or three or more, with spaces between the groups so as to generate longitudinal vortexes between the groups. In addition, the distribution around the periphery may be adapted according to constraints linked to the geometry of the engine, such as, for example, to take into account the presence of the wake of the engine nacelle pylon. Also, it may be wished to break an azimuthal periodicity (in order to change acoustic modes) or not to act in the same manner in relation to noise perceived on the ground and noise generated skyward.

According to one characteristic, the ducts are designed so as to eject each fluid jet by forming, with the longitudinal axis XX', a lateral angle that is between 40 and 70° and, for example, equal to 60°.

A relatively marked lateral incidence is necessary in order that the fluid jets produced take on an orientation that allows them to interact effectively with the ejected gas stream.

According to this orientation of the jets, it is possible to adjust the interaction between the jets and the stream ejected along the longitudinal axis of the jet engine.

According to one characteristic, the ducts called primary ducts are separated from each other, at least one duct called secondary duct being associated with each primary duct and disposed adjacent and parallel to the latter.

Several ducts may be disposed side by side, parallel to each other (in a cluster) so as to eject parallel fluid jets along the same direction, lateral in relation to the longitudinal angle.

In this way there is formed a fluidic sheet that provides a fluidic cover more extensive than that produced by a single duct.

For this reason, the fluidic shield is wider and is therefore more impermeable to the flow outside the wall of the jet engine.

The noise reduction obtained by this arrangement of the ducts therefore is increased.

Moreover, since the jets are not convergent, they do not generate spurious interaction sources.

It will be noted that the different associated ducts may take on slants toward the longitudinal axis (penetration angle) different from one duct to the other so as to adjust the fluidic effect and the configuration of the fluidic cluster formed in this way.

According to one characteristic, the downstream end of the wall comprises a plurality of chevrons distributed around the periphery of the latter in order to form a mechanical acoustic attenuation device.

The chevrons interact with the gas stream originating from the downstream end where they are disposed, thus giving rise to vortexes that are propagated along the stream (in the longitudinal direction of the jet engine) and contribute to reducing the noise.

When the fluid ejection ducts are arranged with reference to the downstream end of the wall, the chevrons may be laid out at this same end in order to reinforce the effect of attenuation of the noise generated by the jet engine.

As a variant, the chevrons may be laid out at another downstream wall end that surrounds the outlet of another stream ejected from the jet engine.

According to another variant, the fluid ejection ducts and the chevrons may be integrated into the same downstream wall end, while another downstream wall end surrounding the outlet of another stream ejected from the jet engine also may be equipped with chevrons alone or with ducts alone or else with chevrons in cooperation with ducts.

According to one characteristic, the ducts are associated with chevrons that impart to the downstream end of the wall a jagged shape comprising a succession of peaks and valleys.

The fluidic jet coming out of each duct is associated with the longitudinal vortex generated at the associated chevron and thus reinforces its noise-reducing action.

According to one characteristic, since each chevron comprises a slanting part connecting the peak to an adjacent valley, the ducts are designed with reference to the chevrons so that each fluid jet is ejected parallel to the direction of slant of one of the slanted parts of the corresponding chevron.

Each duct is, for example, arranged along one of these slanted parts of a chevron and its outlet opening is disposed at the peak of the chevron.

Arranged in this way, the ducts produce jets that extend, as it were, the effects of the chevrons by giving them an incidence. Thus, very dissymmetrical chevrons, as it were, are achieved, and fluidly, that is to say without penalizing aerodynamic performances in cruising.

The invention also has as an object an aircraft comprising at least one aircraft jet engine according to the brief presentation set forth above.

Other characteristics and advantages will become apparent from the description that is going to follow, provided solely by way of non-limitative example and presented with reference to the attached drawings, on which:

FIG. 2b is a partial schematic view seen from above of three ducts shown in FIG. 2a;

Figure 2A:
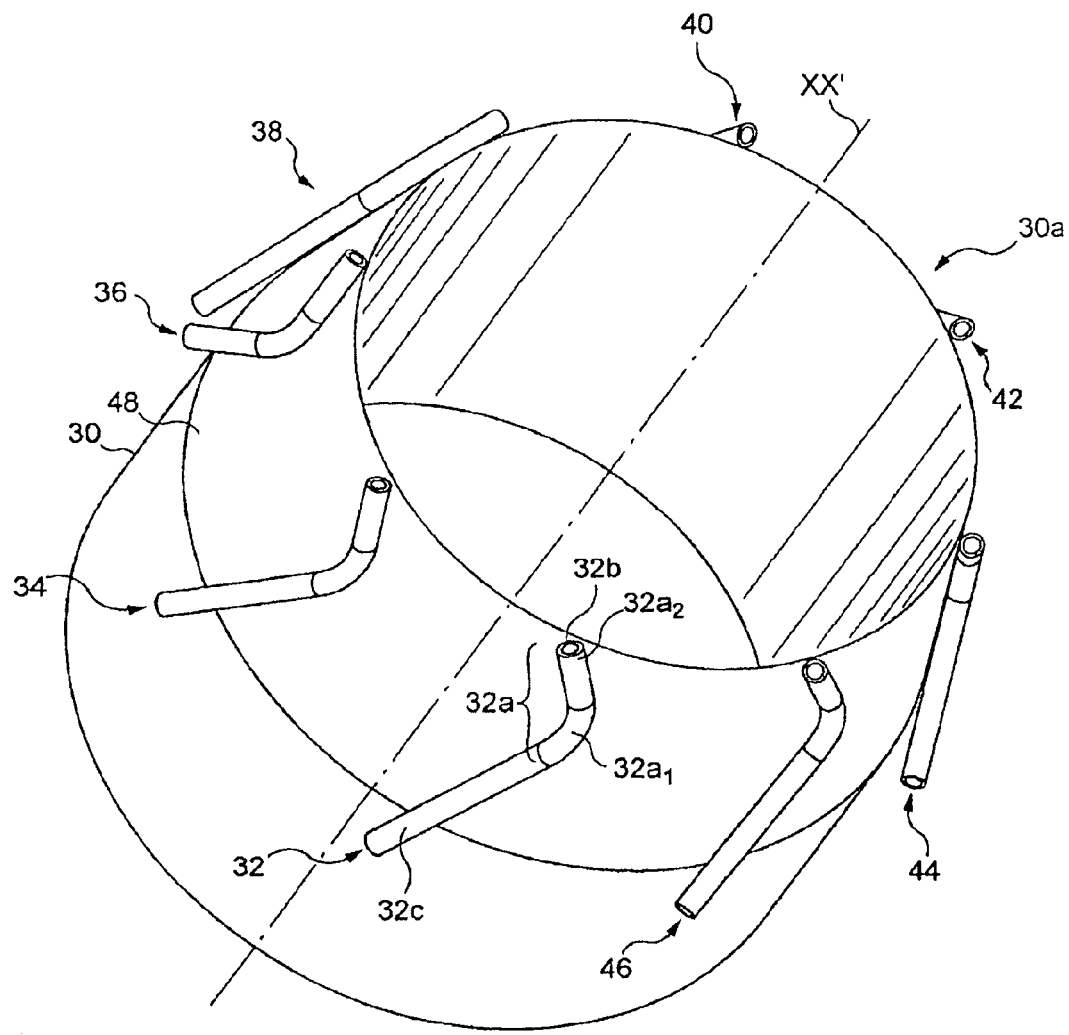
FIG. 2a is a schematic view in perspective of a nacelle wall downstream end equipped according to a first embodiment of the invention.
Figure 2B:
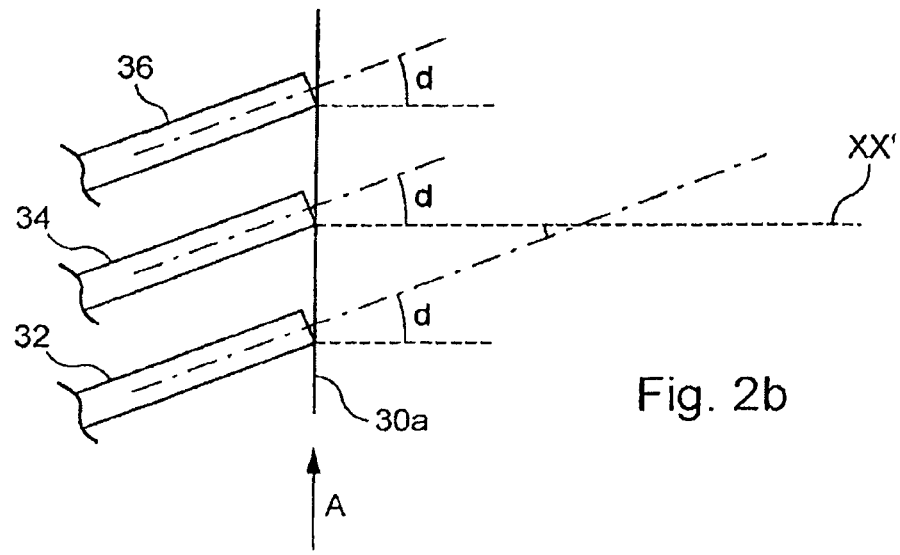
Figure 2C:
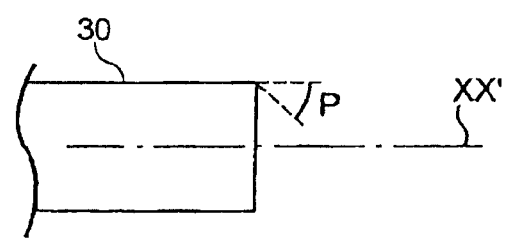
FIG. 2c is a partial schematic view along A showing the slant on the axis (penetration angle) of the jets originating from the ducts.
Figure 2D:
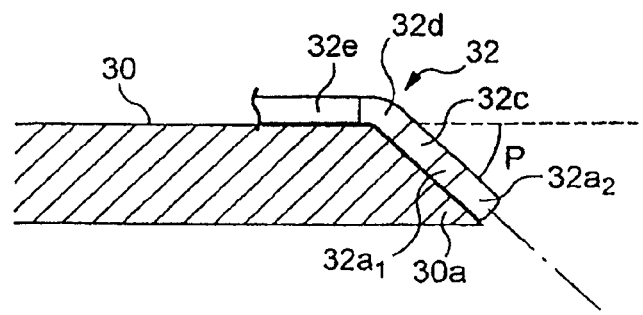
Figure 2E:
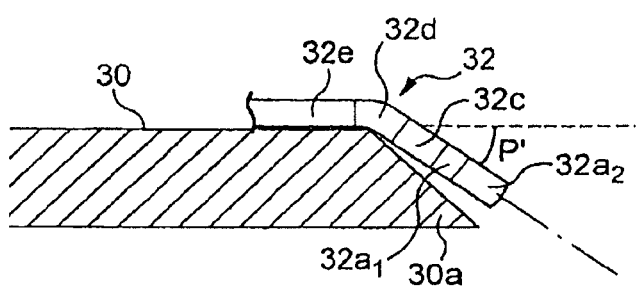
Figure 2F:
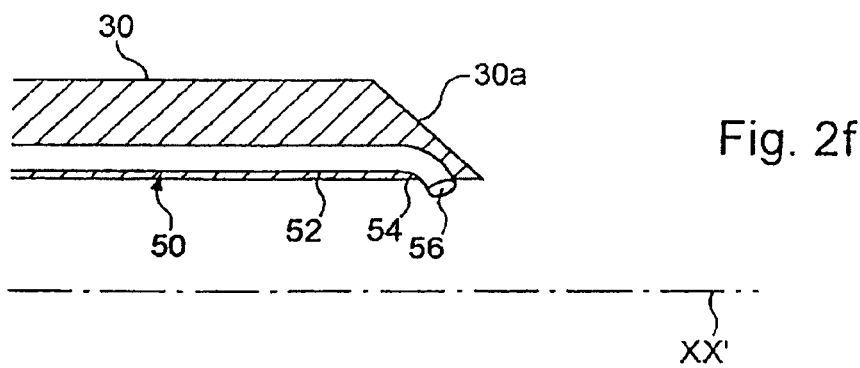

FIG. 2d schematically illustrates the configuration of a bent duct slanted on axis XX';

FIG. 2e illustrates an embodiment variant of the configuration of FIG. 2d;

FIG. 2f schematically illustrates the installation of a duct in the wall of the nacelle;

FIG. 3 is a schematic view in perspective of a nacelle wall downstream end equipped according to a second embodiment of the invention;

FIG. 4a is a partial schematic view in perspective of a nacelle wall downstream end equipped according to a third embodiment of the invention;

FIG. 4b is a partial schematic view in perspective of a nacelle wall downstream end equipped according to a fourth embodiment of the invention.

Figure 1:
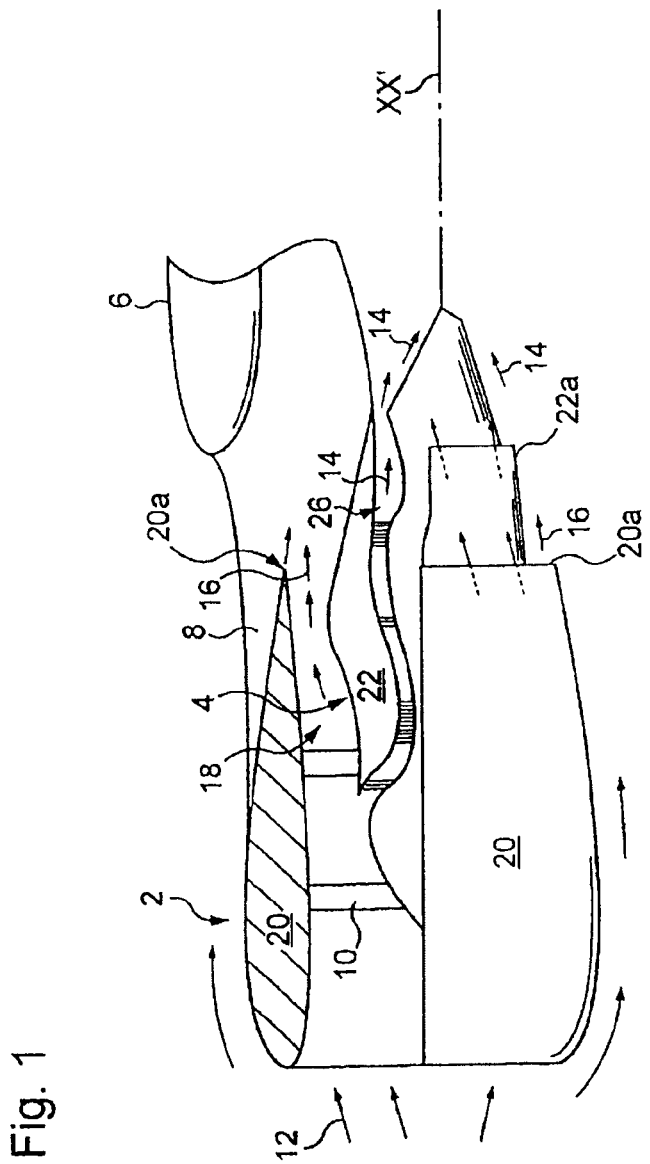
FIG. 1 is a general schematic view in longitudinal section of an aircraft jet engine in which only the upper part of the fan hood has been removed.

As shown in FIG. 1 and designated by the general reference marked 2, an aircraft jet engine nacelle envelops a turbomachine 4 and is installed under a wing 6 of an aircraft in known manner with an jet engine nacelle pylori 8.

The turbomachine 4 comprises a gas generator that drives a fan 10 mounted on the shaft of the generator, upstream from the latter along the longitudinal direction of the jet engine nacelle.

The nacelle has a revolution symmetry around the longitudinal axis XX'.

Air stream 12 that enters the nacelle, passes longitudinally through the latter, penetrates partially into gas generator 4 and participates in combustion.

Hot propulsive stream 14 ejected at the outlet of the generator is called primary stream.

The part of air stream 12 entering the nacelle and that does not pass through the gas generator is carried along by fan 10.

This cold propulsive stream 16, called secondary stream, flows in an annular passage 18 arranged concentrically in relation to primary stream 14.

This passage 18 is formed between an outer longitudinal wall 20 (nacelle hood) and an inner longitudinal wall 22 (engine hood) surrounding the gas generator.

Secondary stream 16 is ejected from the nacelle at downstream end 20a of outer wall 20, more or less along the longitudinal direction of the jet engine.

Inner longitudinal wall 22 defining the outer casing of the gas generator defines with central longitudinal part 24, constituting the core of the engine, another annular passage 26 through which primary stream 14 flows.

This stream more particularly is ejected at downstream end 22a of inner wall 22.

A fluidic device for reduction of the sound level of the jet engine according to the invention is applied to the nacelle of jet engine 2 of FIG. 1.

This device is arranged, for example, with reference to the more or less cylindrical exterior wall 20 (exterior hood) of the nacelle and which surrounds annular passage 18 through which secondary stream 16 is ejected.

It also may be arranged with reference to interior wall 22 (interior hood) of the nacelle that surrounds turbomachine 4 and at the end of which primary stream 14 is ejected.

It will be noted that a fluidic device may be provided at one and/or the other of the two concentric walls (exterior and interior hoods).

More particularly, the fluidic device according to the invention is associated with a so-called downstream end 20a and/or 22a of the wall in question, at the trailing edge thereof (also called outlet lip).

The fluidic device according to the invention is capable of generating, on command, a disturbance of the flow immediately downstream from the downstream end of the wall around the exterior periphery of the stream (primary or secondary) ejected through this end.

It will be noted that the fluidic device according to the invention simply may be added to an existing jet engine nacelle nozzle, without calling into question the whole design and manufacture thereof.

The fluidic disturbance modifies the manner in which the ejected stream meets the exterior stream (which is the air surrounding the nacelle when the ejected stream is the secondary stream) and interacts with the ejected stream in order to form vortexes that are propagated longitudinally downstream.

The aforementioned phenomenon has the purpose of reducing the noise generated by the jet engine equipped in this way, in particular during the phases of take-off and approach of the aircraft.

The device according to the invention may assume different forms of implementation and certain structures of the device are going to be described below.

Nonetheless, each of these structures provides the advantage of effectively reducing the noise generated by a large-size jet engine (for example, exterior ring diameter of the nacelle on the order of a meter).

This advantage is obtained by virtue of the fact that the fluidic disturbance generated forms a fluidic shield (barrier) impermeable or nearly impermeable to the ejected stream (primary or secondary).

In this way, the carrying along of the exterior stream of lower axial speed in the ejected stream of higher axial speed is prevented, or in any case limited. It follows that the production of fine turbulence responsible for high-frequency acoustic radiation is greatly reduced.

To accomplish this, the means making up the device that are capable of generating a fluidic disturbance comprise several ducts for ejection of fluid jets that are disposed around the periphery of the downstream end of one of walls 20 or 22 and with the same geometric orientation.

In this way, the fluid jets generated on command by these ducts have more or less the same angular orientation in relation to the longitudinal axis of the jet engine. They are not aligned with this longitudinal axis.

The jets originating from the ducts in fact each form a lateral angle nearly identical with the longitudinal axis (along a projection view in a plane containing this axis).

The injection of these jets laterally in relation to the longitudinal axis of the ejected stream (primary or secondary stream) at the downstream end of the wall favors the formation of longitudinal vorticities. These longitudinal vorticities are created by interaction of the fluid jets with the mixture layer of the ejected stream (primary or secondary) in which the gas of the stream flows around each jet.

In this way these longitudinal vorticities reduce the acoustic effectiveness of the ejected stream.

On FIG. 2a, several devices according to a first embodiment of the invention are provided on one of the two nacelle walls shown in FIG. 1 and which here is referenced 30. The wall shown in FIG. 2a forms a nozzle in which there flows a stream (primary or secondary) that is ejected at downstream end 30a of the wall along the direction given by axis XX'.

Fluidic devices 32, 34, 36, 38, 40, 42, 44, 46 are, for example, regularly distributed around the exterior periphery of downstream end 30a of the wall, at outlet ring 48, and are spaced apart from each other.

It will be noted that, in other embodiments, the devices may be integrated into the thickness of the wall or on the inner face thereof that is in contact with the flow of the ejected stream (primary or secondary).

It also should be noted that the devices may be distributed differently according to the azimuth.

This makes it possible, for example, to take into account the presence of the jet engine nacelle pylon 8 that modifies the flow.

This non-homogeneous arrangement also makes it possible to take into account the directivity of the noise and the regulatory constraints concerning noise in relation to vicinity. In fact, it is preferable to limit the noise radiated toward the ground than the noise radiated skyward.

The composition of the devices now is going to be described, taking as an example device 32, since all the other devices are identical thereto in this embodiment.

Device 32 comprises a duct that is connected, for example, via an air-supply pipe (not shown) to the high-pressure part of the jet engine.

Duct 32 comprises a terminal portion 32a that is provided, at its free end, with an outlet opening 32b. Supplied in this way with compressed air, the duct conveys this air to the outlet opening thereof where it is ejected in the form of a jet.

In the example shown on FIG. 2a, the opening is of circular shape and the jet takes on a circular diameter. Nonetheless, other configurations for outlet openings are possible.

FIG. 2b shows the arrangement seen from above (in projection in a plane containing XX') of three ducts 32, 34 and 36 with reference to the trailing edge 30a and their slant. The three ducts have more or less the same angular orientation so that the jets coming out of these ducts are oriented in the same direction. This direction forms a lateral angle d with axis XX'.

All the ducts of FIGS. 2a and 2b have the same lateral angle that is generally between 40 and 70°.

The slant of the ducts gives the jets that originate therefrom a tangential speed component in relation to the speed of the propulsive jet (ejected stream). This tangential component, because of the interaction with the propulsive jet, brings about a rotation of the jets on themselves.

When the implementation relates to the ring separating the cold exterior jet (secondary stream) and the hot central jet (primary stream), the rotation of the jets carries cold exterior air along to the interior of the propulsive jet, hot air, on the contrary, coming out again outside the jets.

The result is a homogenization of the temperatures from the outlet of the nozzle, capable of contributing to the reduction of the noise generated by this nozzle. A heat-shield effect also is produced, likewise favorable for the reduction of the radiated noise.

It will be noted that the terminal portion of duct 32 comprises a first part $32a_1$ (FIG. 2a) that is bent in relation to an upstream duct part 32c in order to impart to the duct the orientation (angle d) illustrated on FIG. 2b. Terminal portion 32a comprises a second straight part $32a_2$ that forms the free end of the duct and that has outlet opening 32b.

Furthermore, primary ducts 32a, 32b also are slanted, at least in their terminal part, toward longitudinal axis XX', along an angle p called penetration angle.

Angle p is shown in FIG. 2c that is a view along the direction A of FIG. 2b and that shows, in a side view, the slant on axis XX' of the ducts.

This slant generally is achieved by virtue of the beveled shape of the trailing edge (outlet lip) of the downstream end of the wall, such as shown enlarged in FIG. 2d. Angle p generally is between 8° (slight penetration) and 60° (strong penetration). This slant makes it possible to increase the disturbance of the ejected stream by slanting the fluid jet on the axis of the stream.

In this way, terminal portion 32a and upstream portion 32c of the primary duct are disposed against the slanted outer face of the trailing edge and take on the same orientation in relation to axis XX" as the trailing edge.

Duct 32 comprises, upstream, a part 32d bent in relation to a horizontal straight part 32e arranged against the outer face of wall 30. This bent part imparts the desired slant p to duct 32.

Nonetheless, the ducts alternatively may take on an orientation (angle p') different from that of the trailing edge as shown on FIG. 2e that is a variant of the configuration of FIG. 2d.

It will be noted that angle p' may be more slanted on the axis XX' than angle p in an implementation variant.

Furthermore, it will be noted that the ducts or pipes may be integrated into the thickness of the wall (hood) of the nacelle and therefore take on angles different from those of the wall.

FIG. 2f thus illustrates a variant in which a duct 50 according to the invention is arranged inside wall 30 along the extension (longitudinal) of the wall.

This duct comprises a straight portion 52 and a duct portion 54 forming a bend in relation to the straight portion in order to give the outlet opening 56 of the duct the desired orientation (lateral angle and penetration angle).

The bend is short enough for the outlet opening to open level with the wall or in close proximity thereto.

The duct portion forming the bend may have a continuous curvature and, for example, be produced by bending.

Alternatively, the portion forming the bend may be made up of an upright duct portion connected to the straight portion along a connecting angle.

It furthermore will be noted that installation of the ducts in the wall makes it possible not to increase the space requirement and not to penalize aerodynamic performances.

According to another variant, the ducts may be slanted each according to a different penetration angle in order to adjust the impact of the jets originating from these ducts along the perimeter of downstream end 30a, for example, for reasons of directivity of the noise, environmental constraints . . . . It will be noted, however, that the angles are selected appropriately in order that the jets oriented in this way make it possible to generate longitudinal vortexes.

Lateral injection of the jets around the periphery of the axially ejected stream provides a fluidic cover (not continuous because the jets are not connected) extended over a short distance in relation to downstream end 30a.

It will be noted that the number of ducts to be installed depends on the diameter of the outlet of the nozzle.

In order to reduce the noise linked to the propulsive jets of the jet engines at the time of the take-off phase or the approach phase of the airplane, a blast of compressed air is released through the air ducts right up to the ducts distributed at the outlet ring of the said nozzle. The ring in question may be the one (interior ring) separating the hot stream (primary stream) and the cold stream (secondary stream), or the one separating the cold stream (secondary stream) and the ambient air (nacelle ring). By virtue of the positioning of the ducts at the outlet ring, as well as their distribution, the compressed-air jets are propelled away from the ducts according to the selected lateral and penetration incidences, then disturbing the propulsive jet.

The air jets constitute controlled jets. Connected to the high-pressure part of the jet engine, their supply is actuated only in phases where control is necessary (generally during take-off and landing phases). Beyond these phases, the fluidic devices according to the invention are made inactive by mere cutoff of the compressed air duct. The aircraft equipped in this way shows no penalization in terms of drag or loss of thrust.

It will be noted that the jets may be activated independently of each other, in this way providing a particularly flexible system for disturbance of the ejected stream. Thus, a partial activation of the said jets may be considered: activation of the jets positioned on the top, the bottom, the right or the left of the said nozzle of FIG. 2a, thus modifying the directivity of the noise pollution.

According to a variant, the control jets may be activated in a non-steady manner in order to reduce the outputs of the control jets or to improve the control performances.

It should be noted that the speed of the compressed air circulating in the ducts is more or less identical to the speed of the stream ejected by the nozzle (propulsive jet).

The weight ratio between the output of the air jets ejected by the ducts and that of the ejected stream is between approximately 0.2% and 2%.

According to a variant, the air jets may be supersonic according to the applications considered.

A second embodiment of the invention is illustrated in FIG. 3.

This Figure differs from FIG. 2a by the number of ducts oriented parallel with the same lateral angle (the penetration angle may vary among the ducts).

The arrangement of the ducts of FIG. 2a is taken up again (the ducts of FIG. 2a here are called primary ducts) but several other ducts, referred to as secondary, are added to each primary duct, parallel thereto, in order to form a cluster of ducts having the same orientation (lateral).

In this way, a plurality of clusters 60, 62, 64, 66, 68, 70, 72, 74 are disposed around the periphery of downstream end 30a of wall 30 of the nacelle and eject reinforced jets on command.

Each cluster of ducts is made up, as for cluster 60, of a primary duct 60a (identical to duct 32 of FIG. 2a) with which several, for example three, secondary ducts 60b, 60c, 60d are associated.

Such a cluster produces a fluidic disturbance of greater extent (lateral) and the interaction with the ejected propulsive stream produces amplified effects.

The plurality of nearly contiguous jets originating from a cluster form, as it were, a fluidic sheet.

FIG. 4a illustrates a third embodiment of the invention.

FIG. 4a shows a more or less cylindrical wall 80 of a nozzle (primary or secondary) in which there flows a gas stream (primary or secondary) that is ejected at the downstream end 82 (trailing edge) of this wall.

This downstream end differs from downstream end 30a of FIGS. 2a-2e by the presence of a plurality of successive mechanical chevrons 84 to 96 distributed over the entire periphery of the trailing edge and that impart thereto a jagged shape achieved by cutting.

Downstream end 82 thus is configured with alternating peaks and valleys connected to each other by slanted portions and that constitute a succession of chevron motifs.

Each chevron (such as chevron 86) comprises a peak (86a) and two slanted parts (86b, 86c) respectively connecting this peak to two adjacent valleys (85, 87).

As shown on FIG. 4a, a duct capable of ejecting a fluid jet is associated with each chevron. Only three ducts 98, 100, 102 are shown on this Figure on the outer face of the chevrons.

It should be noted that the ducts alternatively may be located in the thickness of wall 80 in order to disturb the flow outside the wall as little as possible.

According to another variant, the ducts may be arranged on the inner face of wall 80, that is to say inside the nozzle through which the gas stream is ejected.

The ducts are arranged, at least in their terminal portion, parallel to each other so that the fluid jets generated all have the same direction in relation to the longitudinal axis (lateral angle).

More particularly, the ducts may be designed so that their terminal portion is parallel to the direction of slant of one of the slanted parts of the chevrons. In this way, the lateral angle is given by the slant of these slanted parts that form the edges of the chevron, thus bringing about a fluidic dissymmetry of the chevrons.

The ducts, for example, are arranged as close as possible to the edge of the chevrons, as shown on FIG. 4a, so that the outlet opening of the ducts is disposed at the peak of the corresponding chevron.

Located in this way, the fluid jet produces its maximum effects.

In this way the effects are amplified because the jets come to contribute to the vortex structures generated by the chevrons. This arrangement makes it possible to use chevrons of smaller size but of the same effectiveness with lesser penalizations in terms of drag during cruising (because they are smaller and/or less invasive in the propulsive stream).

It will be noted that the outlet opening of each duct is slanted toward longitudinal axis XX' in order to impart the desired penetration angle to the duct in question.

FIG. 4b illustrates a fourth embodiment of the invention that differs from the third embodiment of FIG. 4a by the presence of a plurality of ducts arranged side by side on the chevrons instead of a single duct.

A cluster of ducts (for example three ducts) is disposed close to one of the edges of each chevron motif so that the cluster of fluid jets generated (fluidic sheet) is ejected as close as possible to the peak of the chevron and thus produces a maximal effectiveness.

More particularly, each duct called primary duct, arranged along the edge of the chevron of FIG. 4a is retained. One or more other ducts referred to as secondary (for example two ducts) are added to the primary duct in order to form a cluster of parallel ducts therefore having the same lateral angle.

The three clusters shown thus comprise ducts 98, 104, 106, 100, 108, 111 and 102, 112, 114.

The ducts all may have the same penetration angle within the same cluster and among each of the clusters.

Alternatively, inside the same cluster the ducts may take on different orientations in order to adjust the fluidic effect produced and also the acoustic effect. For example, the duct adjacent to the edge of the chevron may have a penetration angle with a value higher than that of the duct the farthest away.

This arrangement makes it possible to increase the production of longitudinal vortex structures.

According to another variant, the orientations alternatively may vary from one cluster to the other but remain identical within the same cluster.

According to still another variant, the orientations alternatively may vary within the same cluster and from one cluster to the other.

These different variants make it possible to create effects similar to the large quill feathers of birds by mixing different possible orientations of vortexes.

The different arrangements described above make it possible to vary the effects of the jets locally, longitudinally as well as transversely.

These arrangements also make it possible to adapt the geometric orientation of the jets to certain preferred directions for noise pollution emission.

These arrangements moreover make it possible to reduce the noise by distributing the energies.

The different comments and advantages expressed with regard to the embodiment of FIG. 4a also apply to the embodiment of FIG. 4b.

The invention claimed is:

1. An aircraft jet engine with a longitudinal axis comprising:
   a wall surrounding a gas stream that is ejected at a downstream end of the wall along the longitudinal axis;
   plural ducts distributed around the periphery of the downstream end of the wall and each comprising a terminal portion comprising an outlet opening, each duct configured to eject a fluid jet through its outlet opening,
   wherein the ducts are configured to eject fluid jets more or less parallel to each other, each fluid jet ejected through the corresponding outlet opening forming a lateral angle with the longitudinal axis along a projection view in a plane containing the longitudinal axis, and
   wherein the ducts include primary ducts that are spaced apart from each other and the ducts include at least one secondary duct added adjacent and parallel to each primary duct to form clusters of ducts having a same orientation.

2. A jet engine according to claim 1, wherein the ducts are configured to eject each fluid jet slanted toward the longitudinal axis along a penetration angle.

3. A jet engine according to claim 2, wherein the penetration angle is between 8 and 60°.

4. A jet engine according to claim 1, wherein the lateral angle is formed by orientation of the terminal portion of a duct with the longitudinal axis, while the penetration angle is formed by a slant of the outlet opening of the duct toward the longitudinal axis.

5. A jet engine according to claim 1, wherein the lateral angle is formed by orientation of the outlet opening of a duct with the longitudinal axis while the penetration angle is formed by a slant of the terminal portion of a duct toward the longitudinal axis.

6. A jet engine according to claim 1, wherein the lateral angle is between 40 and 70°.

7. A jet engine according to claim 1, wherein the downstream end of the wall comprises a plurality of chevrons distributed around a periphery thereof to form a mechanical acoustic attenuation device.

8. A jet engine according to claim 7, wherein the ducts are associated with the chevrons that impart to the downstream end of the wall a jagged shape comprising a succession of peaks and valleys.

9. An aircraft comprising at least one aircraft jet engine according to claim 1.

* * * * *